United States Patent
Deshpande et al.

(10) Patent No.: US 7,829,630 B2
(45) Date of Patent: Nov. 9, 2010

(54) STYRENATED TERPENE RESIN AS WELL AS METHODS OF MAKING AND USING THE SAME

(75) Inventors: Abhay K. Deshpande, Savannah, GA (US); George A. Locko, Savannah, GA (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

(21) Appl. No.: 11/779,238

(22) Filed: Jul. 17, 2007

(65) Prior Publication Data

US 2008/0014454 A1     Jan. 17, 2008

Related U.S. Application Data

(60) Provisional application No. 60/831,422, filed on Jul. 17, 2006.

(51) Int. Cl.
    *C08L 9/00*     (2006.01)
    *C08L 53/00*     (2006.01)
    *C08L 89/00*     (2006.01)
    *C08F 210/00*     (2006.01)
    *C09J 5/02*     (2006.01)

(52) U.S. Cl. ............... 525/98; 524/505; 526/348; 106/147.4; 156/308.6

(58) Field of Classification Search ............... 525/98; 524/505; 526/348; 106/147.4; 156/308.6
See application file for complete search history.

(56) References Cited

U.S. PATENT DOCUMENTS 4,959,412 A *    9/1990    Arter et al. ............... 525/98

\* cited by examiner

*Primary Examiner*—William K Cheung

(57) ABSTRACT

The present invention relates to styrenated terpene resin, as well as methods of making an using the same.

18 Claims, No Drawings

US 7,829,630 B2

STYRENATED TERPENE RESIN AS WELL AS METHODS OF MAKING AND USING THE SAME

RELATED APPLICATION DATA

This application claims priority of U.S. Provisional Patent Application Ser. No. 60/831,422, filed Jul. 17, 2006, which application is hereby incorporated by reference.

BACKGROUND OF THE INVENTION

1. Field of the Invention

The present invention relates to polymers, to products comprising such polymers, and the methods of making and using such polymers and products. In another aspect, the present invention relates to styrenated terpene resin, to products comprising such resin, as well as to methods of making and using such resin and products.

2. Description of the Related Art

Modified terpene resins, such as styrenated terpene resins find use as tackifiers in the adhesive industry, especially the are of hot melt packaging, non-woven, and hot melt pressure-sensitive adhesives. Such resins are co-polymers of a terpene—obtained from pine trees (via sulfate turpentine, a by-product of the Kraft paper manufacturing process or gum turpentine, which is obtained from living pine trees), or obtained from citrus sources, such as orange peels and styrene. The useful terpenes for synthesizing such co-polymers, obtained from pine trees have the general formula $C_{10}H_{16}$. Typical examples are alpha pinene, beta pinene, Dipentene, and delta-3-carene. A very useful terpene obtained from citrus sources in d-limonene (also $C_{10}H_{16}$). The styrene-terpene copolymers useful for adhesive applications are predominantly obtained via cationic polymerization of the terpene (or a blend of terpenes) and styrene, using Lewis acid catalysts such as aluminum chloride, aluminum bromide, boron trifluoride, tin chloride, titanium chloride, ether complexes of boron trifluoride, etc, in a hydrocarbon solvent such as toluene, xylene, naphtha, etc. The typical styrenated terpene resins are solids at ambient temperature and the most useful tackifier resins used in hot melt packaging, non-woven and hot melt pressure sensitive adhesives are those with a softening point (SP) of from about 95 to about 115° C., a weight average molecular weight (Mw) of less than about 2000, a number average molecular weight (Mn) of less than about 1000, and a polydispersity of less than about 2.0. Cationic polymerization processes enable syntheses of styrenated terpene resins with the aforementioned properties. In contrast, free radical or anionic polymerization of styrene and a terpene tends to produce resins with substantially higher MW (e.g. U.S. Pat. No. 5,364,723 mentions syntheses of styrene-myrcene resins with Mw values of greater than 38000 and Mn values greater than 8000 obtained via free radical and anionic polymerization processes), and such resins cannot adequately function as tackifiers in hot melt packaging, non-woven adhesives, or hot melt pressure-sensitive adhesives.

Although styrenated terpene resins can be synthesized using any of the aforementioned terpenes, historically it has been d-limonene or even dipentene (racemic limonene) that has been found to have the most favorable impact on overall reactivity and ease of polymerization of the terpene-styrene system under cationic polymerization conditions. These terpenes facilitate molecular weight (MW) build-up to the desired degree, allow better control of MW, facilitate softening point build-up and control, afford light colored resins, and result in overall excellent yields of the final resin product.

When syntheses of styrenated terpene resins are carried out using other terpenes (i.e. alpha pinene, beta pinene, delta-3-carene, etc.) under Lewis acid-catalyzed cationic polymerization conditions, one is confronted with one or more of the following hurdles: difficulty to build up MW and softening point, severe yield loss, excessive MW build-up and therefore an unfavorable impact on resin compatibility in adhesive systems, a strong tendency toward excessive formation of low MW by-products, etc.

The following commercial styrenated terpene resins are available from Arizona Chemical Company:

| | |
|---|---|
| SYLVARES ® ZT105LT: | 105° C. softening point |
| SYLVARES ® ZT106LT: | 105° C. softening point |
| SYLVARES ® M 106: | 105° C. softening point |

Each of the resins listed above is produced via cationic polymerization process using a Lewis Acid catalyst. The resins are based on limonene as the major terpene component. The limonene content in all these resins is between 40 and 70% with the CST-derived terpene components constituting 0-30% of the formulations.

The majority of available crude D-limonene in the world is derived from orange peels with Brazilian crude being a major source. The global availability is typically about 60 metric tons, of which about 50% is consumed by the aroma chemicals and solvent/cleaner industries. The crude limonene that is ultimately available for resins is shared between multiple resin producers. The crude limonene is not pure enough to allow its use as a monomer for cationic polymerization processes, and consequently, resin producers refine the crude. Typically, the refined limonene has a 95% or higher purity.

A major portion of the limonene in the world that is available to resin producers is used for the manufacture of styrenated terpene resins. Consequently, there is always the need to buy adequate crude limonene each year to meet sales volumes. However, limonene availability and pricing depends not as much on demand as on the orange crop situation during the particular year. In addition, recently there has been a surge of interest in the use of polyterpene resins based on limonene (co-polymers of limonene and other CST-derived terpenes based on cationic polymerization similar to the styrenated terpene resins) for applications in areas other than traditional uses such as non-wovens. If the volumes of limonene-based polyterpenes for these new uses do grow rapidly, then the availability of styrenated terpene resins for applications in traditional areas would be jeopardized.

In any no/low limonene formulation to synthesize styrenated terpene resins, it would be preferable to employ as large an amount of alpha pinene as possible since this is the most abundant terpene available in most of the CST and Gum Turpentine found in the world. However, cationic polymerization of alpha pinene to produce high softening point and high MW resins is not straightforward under standard conditions of Lewis Acid-catalyzed polymerizations. Standard processes with alpha pinene as the key/sole terpene monomer lead to low yields of solid resin and even at these low yields, the softening points are not very high.

A means of increasing softening point and MW of terpene resins based on high levels, even up to 100%, of alpha pinene via cationic polymerization, is to employ lower polymerization temperatures, typically sub-zero temperatures. Frequently, cationic polymerization processes under such lower reaction temperatures also involve use of modified Lewis acid catalysts instead of conventional Lewis acid catalysts. U.S.

Pat. Nos. 3,478,007, 3,622,550, 4,016,346, 4,057,682, and 4,113,653 describe syntheses of 100-115° C. s.p. resins based on alpha pinene as the sole terpene or main terpene in combination with other terpenes or non-aromatic hydrocarbons using such low polymerization temperatures. These patents also describe the preferred use of catalyst systems such as aluminum chloride-trialkylchlorosilanes, aluminum chloride-antimony halides, and aluminum halide-organogermanium halides or alkoxides. However, none of these patents describes the co-polymerization of alpha pinene with a vinylaromatic, such as styrene or alpha methylstyrene.

A major drawback about the US patents listed above is that they all involve the use of toxic and sometimes very expensive catalyst systems such as antimony halides, trialkylhalosilanes and organogermanium halides and alkoxides. Catalyst removal and/or recovery systems with such processes can also be a hurdle for economic justification for employing such polymerization conditions.

SUMMARY OF THE INVENTION

Some embodiments of the present invention provide a synthetic route to styrenated terpene resins by a process that facilitates minimizing or eliminating the need for limonene as a key terpene component of the formulation.

Some embodiments of the present invention provide a synthetic route to styrenated terpene resins with at least a 95° C. s.p., preferably greater than 100° C., obtained at high yields from formulations based on high levels of CST-derived terpenes such as beta pinene and alpha pinene, and with minimal or no limonene.

Some embodiments of the present invention provide a synthetic route to such styrenated terpene resins using formulations that use maximum possible levels of alpha pinene.

Some embodiments of the present invention provide a process that is based on lower polymerization temperatures using a Lewis acid catalyst system that is not based on toxic or expensive systems.

Some embodiments of the present invention provide a synthetic route to afford a styrenated terpene resin based on minimal or no limonene with acceptable characteristics to function comparably (in adhesives) to commercialized limonene-based styrenated terpene resins.

According to one embodiment of the present invention, there is provided a styrenated terpene resin, made from a reaction product comprising: less than 15 wt % of limonene; from 25 to 35 wt % of alpha pinene; from 25 to 45 wt % beta pinene; and, from greater than 25 wt % of styrene or derivative thereof.

According to another embodiment of the present invention, there is provided an adhesive comprising a styrenated terpene resin made from a reaction product comprising: less than 15 wt % of limonene; from 25 to 35 wt % of alpha pinene; from 25 to 45 wt % beta pinene; and, from greater than 25 wt % of styrene or derivative thereof.

According to even another embodiment of the present invention, there is provided a method of making a styrenated terpene resin, comprising:

polymerization of a reaction mixture in the presence of a metal halide catalyst at a temperature ranging from −20° C. to +10° C., wherein the reaction mixture comprises less than 15 wt % of limonene; from 25 to 35 wt % of alpha pinene; from 25 to 45 wt % beta pinene; and, from greater than 25 wt % of styrene or derivative thereof.

According to still another embodiment of the present invention, there is provided a method of adhering comprising: placing an adhesive between a first surface and a second surface, wherein the adhesive comprises styrenated terpene resin, made from a reaction product comprising: less than 15 wt % of limonene; from 25 to 35 wt % of alpha pinene; from 25 to 45 wt % beta pinene; and, from greater than 25 wt % of styrene or derivative thereof.

According to yet another embodiment of the present invention, there is provided a product comprising: a first surface; a second surface; and an adhesive positioned between and joining the first surface and the second surface, wherein the adhesive comprises styrenated terpene resin, made from a reaction product comprising: less than 15 wt % of limonene; from 25 to 35 wt % of alpha pinene; from 25 to 45 wt % beta pinene; and, from greater than 25 wt % of styrene or derivative thereof.

Other embodiments will become apparent to those of skill in the art upon review of this patent specification.

DETAILED DESCRIPTION OF THE INVENTION

The present invention provides a styrenated terpene resin based on an economical and plant friendly process with either no limonene or minimal limonene. The desired characteristics/features of such a resin can be summarized as having one or more characteristic as follows:

Formulation: based on 0-5% limonene, >65% CST-derived terpenes, and >25% styrene.

Target softening point (s.p.): at least 95° C.

Molecular Weight (MW): comparable to commercially available resins such as SYLVARES® ZT106LT, M106 or ZT105LT (available from Arizona Chemical Company).

Performance characteristics: similar to commercially available resins such as SYLVARES® ZT106LT, M106 or ZT105LT (available from Arizona Chemical Company) in adhesive formulations.

In the present invention, styrenated terpene resins were synthesized using various alpha pinene-based formulations (alpha pinene content between 15 and 60% by weight) under standard polymerization conditions, and obtained resins where the softening points ranged from 76-94° C. and yields ranged from 58-89%. Styrenated terpene resins with a softening point less than 100° C. were obtained when using standard procedure for formulations that incorporated 0-15% limonene and >50% CST-derived terpenes.

The difficulty in achieving a s.p. of greater than 100° C. was primarily due to the fact that the new formulations contained a fairly large amount of alpha pinene. A higher level of alpha pinene in resin formulations tends to lead to greater degree of chain termination by-products under cationic polymerization conditions described above. Chain termination is accelerated during cationic polymerization as polymerization temperatures are increased, and a temperature of 45° C. is favorable for such an unwanted process from the sterically hindered alpha pinene. The greater the extent of chain termination, the lower the overall molecular weight, and the more difficult it is to raise softening point or MW appreciably.

Embodiments of the present invention provide a process to synthesize styrenated terpene resins with a softening point of at least 95° C., preferably at least 100° C., based on formulations that consist of no limonene, or extremely low levels of limonene (a by-product of the citrus industry), and substantially high levels of CST-derived terpenes. Preferably, the resins may be made by a cationic polymerization process. More preferably, a process that does not use any modified Lewis acid catalysts. Most preferably, a process that employs polymerization temperatures from −20° C. to +10° C.

In some embodiments, the resin, and processes of the present invention may incorporate any terpene, preferably CST-derived terpenes. Non-limiting exemplary CST-derived terpenes suitable for use in preparing styrenated terpene resins include (without limitation), dipentene, α-pinene, β-pinene, and δ-3-carene, where each of these terpenes is available from various commercial suppliers, e.g., Aldrich Chemical (Milwaukee, Wis.), Arizona Chemical Company, Jacksonville, Fla. (under trade names such as SYLVAPINE® A terpene, SYLVAPINE® B terpene, SYLVAPINE® 405 terpene, SYLVAPINE® 402, etc.), Bush Boake & Allen/International Flavors and Fragrances, Jacksonville, Fla. (under trade names such as UNITENE® LP terpene), and Millennium Specialty Chemicals, Jacksonville, Fla. (under trade names such as MILLENNIUM® 2B13 terpene). α-Pinene and β-pinene monomers are commonly obtained by distillation of crude sulfate turpentine, which is a by-product of the paper industry. Resin grade α-Pinene is about 94% by weight α-pinene. Resin-grade β-pinene is generally about 80% by weight β-pinene and about 20% by weight α-pinene. More pure grades of β-pinene, such as the so-called aroma-chemical grade thereof, which is greater than 90% by weight β-pinene, may also be used in preparing these styrenated terpene resins.

Styrene can be obtained from a number of sources such as Aldrich Chemical (Milwaukee, Wis.), Westlake, Chevron Phillips Chemical, US Chemicals, Inc., etc. Further, derivatives of styrene may be used in the present invention. A non-limiting example of such derivatives includes but is not limited to alpha methyl styrene.

Lewis acids are used to facilitate the preparation of styrenated terpene resins, where suitable Lewis acids include, but are not limited to, metal halides, such as for example aluminum halides and derivatives or complexes thereof. Non-limiting examples of halides include, but not limited to, fluoride, chloride, bromide, iodide, and astatide.

The following monomer combinations are suitable to afford styrenated terpene resins with softening points of at least 95° C. at very good yields and acceptable MW characteristics (for use as tackifiers in hot melt and pressure sensitive adhesives):

Alpha pinene, beta pinene, and styrene; and/or

Alpha pinene, beta pinene, limonene, and styrene.

Non-limiting exemplary solvents for the polymerization process include aromatic hydrocarbons, non-limiting examples of which include the preferred toluene and xylene.

The polymerization process may be carried out at any suitable temperature. A non-limiting example includes at temperatures between −20° C. and +10° C., preferably at temperatures of −10° C. and +5° C. The temperature of polymerization may be −20, −15, −10, −9, −8, −7, −6, −5, −4, −3, −2, −1, 0, 1, 2, 3, 4, 5, and 10° C., including any and all ranges and sub-ranges therein. Certainly, the polymerization process may be carried out at temperatures above or below those shown above.

The polymerization process may be carried for any suitable time. As a non-limiting example, the polymerization process may be carried out at the said polymerization temperature for a period of from about 30 minutes to about 3 hours; preferably between 60 minutes and 2 hours. The time includes ½, ¾, 1, 1.25, 1.5, 1.75, 2.0, 2.25, 2.5, 2.75, and 3 hours, including any and all ranges and sub-ranges therein. Certainly, the polymerization process may be carried out for times above or below those shown above.

The polymerization may be carried out under any desirable stoichiometry. As a non-limiting example, the polymerization process may be carried out using a wide range of weight ratios of styrene (or derivative thereof) to total terpene, preferably from 15:85 to 85:15, more preferably from 20:80 to 40:60, most preferably, from 25:75 to 35:65. This weight ratio of styrene to total terpene includes, but is not limited to, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, and 95:5, including any and all ranges and sub-ranges therein. Certainly, the polymerization process may be carried out under stoichiometry above or below those shown above.

The polymerization process is carried out using a wide range of weight % of alpha pinene in the resin formulation, generally from 1 to 99 wt %, preferably from 10 to 90 wt %, more preferably from 15 to 50 wt %, most preferably 30%. The wt % of alpha pinene may be 1, 5, 10, 15, 20, 25, 30, 35, 40, 45, 50, 55, 60, 65, 70, 75, 80, 85, 90, and 95 wt %, including any and all ranges and sub-ranges therein. The "wt %" is based upon the total weight of the reaction mixture herein this document.

The polymerization process is carried out using a wide range of weight % of beta pinene in the resin formulation, generally from 1 to 99 wt %, preferably from 10 to 90 wt %, more preferably from 25 to 50 wt %, most preferably from 35 to 40 wt %. The wt % of beta pinene may be 1, 5, 10, 15, 20, 25, 30, 35, 40, 45, 50, 55, 60, 65, 70, 75, 80, 85, 90, and 95 wt %, including any and all ranges and sub-ranges therein. The "wt %" is based upon the total weight of the reaction mixture herein this document.

The polymerization process is carried out using a wide range of weight % of limonene in the resin formulation, preferably less than 25 wt %, more preferably less than 15 wt %, most preferably less than 5 wt %. The wt % of limonene may be less than or equal to 1, 2, 3, 4, 5, 6, 7, 8, 9, 10, 12, 14, 16, 18, 20, 22, and 25 wt %, including any and all ranges and sub-ranges therein. The "wt %" is based upon the total weight of the reaction mixture herein this document.

During the polymerization process, a wide range of catalyst to monomer weight ratios may be used, but this ratio is preferably from 0.1 to 0.001, more preferably from 0.05 to 0.02, most preferably from 0.04 to 0.03. The catalyst to monomer weight ratio may be 0.1, 0.08, 0.06, 0.05, 0.04, 0.039, 0.038, 0.037, 0.036, 0.035, 0.034, 0.033, 0.032, 0.031, 0.030, 0.02, 0.01, 0.008, 0.006, 0.004, 0.002, and 0.001, including any and all ranges and sub-ranges therein.

The present invention is explained in more detail with the aid of the following examples which are not intended to and do not limit the scope of the claims of the present invention in any manner.

EXAMPLES

Resin evaluation may be carried out by a number of different methods such as measuring hot melt adhesive cloud points, testing adhesive properties of hot melt and pressure sensitive adhesives made with such resin, studying oxidative (color) stability of resin over a period of storage at certain temperatures, and resin odor.

EVA Cloud Point Test:

A measure of the usefulness of a resin in any adhesive formulation is its compatibility with the other components of the adhesive—primarily the polymer and wax. A test that indicates resin compatibility is the Cloud Point Test. The lower the cloud point, the higher the compatibility—which is what is preferred by the adhesive formulator. When developing an offset for an existing resin, the similarity in cloud points is a fairly good indicator of the new resin's potential to perform comparably to the existing one.

In a glass jar, the following components are combined in a 1:1:1 wt. ratio: Resin, Polymer, and Paraffin wax. The polymer is typically an Ethylene Vinyl Acetate polymer containing 28% Vinyl Acetate. A common brand is ELVAX 250 available from DuPont. The glass jar is then placed in an oven at 177° C. After allowing the blend to stand for 45 minutes, the mixture is manually stirred with a glass rod and placed back in the oven. At this stage, the blend is clear. The stirring is repeated two more times at 20-minute intervals. Subsequently, the blend is removed from the oven. A thermometer is inserted in the blend and quickly lifted out and clamped to a stand directly above the glass jar. As the adhesive strand flowing from the bulb cools down, it starts to thicken and turn cloudy from bottom up. The temperature at which the thermometer bulb begins to turn cloudy is recorded as the cloud point of the resin.

EVA Adhesives:

Adhesive Compounding

Adhesives containing an EVA polymer were compounded in a pint can. Total adhesive weight was 200 grams. Wax and antioxidant were weighed directly into the can, which was placed into a heating mantle. A temperature probe was inserted between the can and the mantle, which was used to control the temperature to 140° C. Once the wax was molten a flat dispersing blade was inserted and agitation at approximately 140 rpm was begun. Polymer was added at a rate to avoid clumping. Once the polymer was entirely molten, resin was added. Once the mixture appeared entirely melted and homogeneous, mixing was continued for 20 to 30 minutes. The mixture was poured onto Teflon treated fabric and allowed to cool.

Olinger Bond Testing

A small amount of each sample (~20 g) was melted at 340° F. in the melt tank of the Olinger and then purged through the gun. About 40 g of resin was then melted and application amount was tested by inserting Teflon treated fabric in the sample sled, setting open time to the longest setting and running the device so a bead was applied to the fabric that could easily be removed and weighed. Melt tank pressure was adjusted on subsequent samples so the amount of applied adhesive is within 5% of the first sample. The force required to separate the substrates was recorded. The greater the force, the stronger the adhesive bond to the substrate.

PSA Adhesives:

PSAs are typically based on styrenic block copolymers (SBC) such as SIS (styrene-isoprene-styrene) and SBS (styrene-butadiene-styrene). The tackifiers used for such adhesives can be compatible with the mid-block of the block copolymer (i.e. isoprene or butadiene component), the end-block component, i.e. styrene, or both. Styrenated terpene resins find utility in such adhesives. The SBC is categorized by two major criteria: the styrene content and the diblock content. Depending upon the requirements of the formulator, the nature and/or amount of SBC can be adjusted in the formulation. SBC-based PSAs include a mineral oil—to soften the polymer and lower viscosity of the adhesive.

Pressure sensitive adhesives were compounded in a pint jar at room temperature. Total adhesive weight was 100 grams. The mineral oil was added directly to the jar. Approximately 90 grams of toluene was added and a flat dispersing blade was used to agitate the toluene at approximately 200 rpm. Subsequently, the polymer (SBC) was added at a rate to avoid clumping. After the polymer had dissolved, the resin was added. Once a homogeneous appearing mixture was obtained mixing was continued for 20 to 30 minutes.

Adhesive Coating

Pressure sensitive adhesives were coated by hand using a micrometer controlled gap coater from Paul N. Gardner Company, Inc. The wet adhesive (in toluene) was coated to a thickness of 1 mil on two-mil polyester. The coating was dried for 15 minutes at room temperature, and then additional five minutes at 100° C. A second layer of two-mil polyester was laminated on top of the adhesive and the total thickness was measured. Wet coating thickness was adjusted until a dry adhesive layer between 1.0 and 1.1 mil was obtained. Each draw down was tested for adhesive thickness.

PSA Testing:

Samples are cut into one-inch wide strips using a Cheminstruments DC-500 Sample Die cutter. All testing was done using stainless steel panels for substrate, also available from Cheminstruments.

Peel Tests (a Measure of Adhesive Bond Strength)

Peel testing was done on an Instron 4201 at 12"/minute at 180° pull. Software was used to eliminate measurements at the beginning and end of test. Reported number is the average force used to peel over three to four inches of length. Samples were applied to substrate using a Chemsultants roll down device to apply uniform pressure to the sample. This device uses a rubber coated 2 kg, 4.5 cm wide roller moving at 10 inches/minute to apply pressure to the sample. The roller was allowed to pass over each sample three times. Samples had a 15-minute dwell following application prior to testing.

Shear Adhesion Failure Temperature (SAFT) Tests (a Measure of High Temperature Performance of the Adhesive and its Cohesive Strength)

A 1-inch wide strip of the sample was applied to a stainless steel panel for one inch of the length. Each sample was firmly applied to the steel substrate using a tongue depressor that had been cut to a flat end. Samples had a 30-minute dwell following application prior to testing. The panels were hung in a Cheminstruments HT-8 high temperature shear tester, which had been placed in a Blue M programmable oven. Following the 30 minute dwell a 500 gram weight was hung on the sample, the oven door closed, and an oven program started which would increase the temperature at one ° F. per minute. A time/temperature profile was kept for each test and the temperature at which the sample fell was recorded. The higher the temperature, the better the high temperature performance of the adhesive.

Loop Tack (a Measure of Instantaneous Tack)

One half inch of the ends of nine by one inch samples were placed in the upper jaws of the 4201 Instron. The backing paper was removed and the sample was positioned so that the adhesive was on the outside of a teardrop shaped loop hanging down from the upper jaw. A one-inch wide coupon of the test substrate was oriented in the bottom jaw with the flat surface facing up and the one-inch dimension parallel to the loop of sample. The loop was moved downward at 10 inches/minute until the sample was in full contact with the substrate. After a two second dwell the upper jaw moved upwards at 12 inches/minute and the maximum force required to separate the sample from the substrate was recorded. The greater the force, the stronger the adhesive bond to the substrate.

Softening Points of resins were measured using a Mettler instrument with stainless steel balls using a 1.8° C./min temperature ramp rate. Glass Transition Temperature was measured using Differential Scanning Calorimetry (DSC). Molecular Weight was determined by gel permeation chromatography (GPC).

Storage stability of the resin was measured by monitoring neat color of resin on a weekly basis while storing a 200 gram sample of the resin in an oven held at 93° F. (34° C.) in an oxygen atmosphere.

Storage stability of resin was also measured by holding the resin molten at a temperature of 185° C. for 48 hours and measuring color at specified intervals. Frequently, adhesive manufacturers store their tackifiers molten in a storage tank at temperatures well above the resin softening point. Exposure to such conditions can be for a few hours to a few days before the resin is eventually combined with other ingredients that form the final adhesive. It is critical that there is no/minimal change in resin color during molten storage.

Odor of resin was evaluated by an odor panel. The method consisted of placing about 30 grams of resin sample in a 4 oz jar, capping the jar, allowing the jar to remain in an oven held at 50° C. for 2 hours, and then having panelists smell the resin at 30 minute intervals (while the resin continued to be held at 50° C.) and rating odor intensity on a scale of 0-10 (0 being mild/none and 10 being strong/very unpleasant).

Example 1

Process of Invention Using α, β, Sty—i.e. with 0% Limonene: Fed at −10° C.

To a 1.0 Liter flask was charged 140 g of Arizona Chemical's Panama City plant recovered terpene resin solvent (xylene) and 10.5 g of anhydrous aluminum chloride and the suspension was stirred under a nitrogen atmosphere at ambient temperature. The suspension was then cooled to −10° C. Using an addition funnel, 175 grams of a blend of alpha pinene, beta pinene and styrene (35:35:30 weight ratio) was introduced into the flask over a period of 30 minutes, while maintaining the polymerization temperature at −12° C. to −8° C. (cooling externally, as needed, using an ethanol-dry ice mixture). After the blend was fed, the reaction contents were allowed to stir further at −12° C. to −8° C. for 2 hours. Subsequently, the contents were warmed to 25° C. and allowed to stir for 3 hours. At the end of the 3-hour period, the contents were quenched (catalyst is not neutralized) with 100 g cold water. The rest of the procedure was the same as that described in Comparative Example 1. The resulting resin had h ad the following properties: s.p.=95.6° C., yield=94.4° C., neat color=3+Gardner.

Example 2

Process of Invention Using α, β, Limo, Sty: Fed at −10° C.

Same procedure as in Example 1 except that the catalyst charge was 6.1 g and a blend of alpha pinene, beta pinene, limonene, and styrene (30:37:3:30 weight ratio) was introduced into the flask over a period of 60 minutes while maintaining the polymerization temperature at −12 to −8° C. After the blend was fed, the reaction contents were immediately warmed to 45° C. and allowed to stir for 90 minutes. The resulting resin had the following properties: s.p.=103.1° C., yield=89.0%, neat color=2 Gardner.

Example 3

Process of Invention Using α, β, Limo, Sty: Fed at +5° C.

Same procedure as in Example 1 except that the polymerization temperature was +5° C. and a blend of alpha pinene, beta pinene, limonene, and styrene (30:37:3:30 weight ratio) was introduced into the flask over a period of 60 minutes while maintaining the polymerization temperature at +3 to +7° C. After the blend was fed, the reaction contents were immediately warmed to 45° C. and allowed to stir for 90 minutes. The resulting resin had the following properties: s.p.=103.9° C., yield=88.0%, neat color=1+Gardner.

Example 4

Process of Invention Using α, β, Limo, Sty: Fed at −10° C.

Same procedure as in Example 1 except that that a blend of alpha pinene, beta pinene, limonene, and styrene (30:35:5:30 weight ratio) was used, and after the blend was fed, the reaction contents were immediately warmed to 25° C. and allowed to stir for 90 minutes. The catalyst was neutralized by addition of a mixture of clay (Filtrol 20) and lime. The contents were heated and allowed to reflux for 2 hours. The mixture was then filtered to give a clear resin solution. The resulting resin had the following properties: s.p.=100.0° C., yield=80.0%, neat color=5 Gardner.

Comparative Example 1

Current Process Conditions with α, β, Sty—i.e. with 0% Limonene

To a 1.0 Liter flask is charged 140 g of xylene and 5.7 g of anhydrous aluminum chloride and the suspension is stirred under a nitrogen atmosphere at ambient temperature. The suspension is then warmed to 45° C. Using an addition funnel, 175 grams of a blend of alpha pinene, beta pinene and styrene (30:40:30 weight ratio) is introduced into the flask over a period of 60 minutes, while maintaining the polymerization temperature at 45-47° C. (cooling externally, as needed, using a water-ice mixture). After the blend has been fed, the reaction contents are quenched (catalyst is neutralized) with 100 g cold water. The contents are stirred and heated to 75-80° C. After stirring at 75-80° C. for 10 minutes, the aqueous layer is removed and the organic solution is washed with 100 g of water. The contents are heated again to 75-80° C. and the aqueous and organic layers separated. The organic layer constitutes the resin solution. This resin solution is then heated under a nitrogen atmosphere to 240° C. Most solvent and low boiling by-products are distilled between 140-200° C. Once the temperature reaches 240° C., a sample of the molten resin is collected and its softening point measured. The resin is stripped further using a nitrogen sparge (to remove low molecular weight by-products) till the desired s.p. is achieved. The maximum softening achieved was 91.1° C. At this point, the molten resin is poured into a container for storage. Resin had a neat color=2+Gardner, and overall yield was 84%. If required, the resin can be bleached, to lighten its color, at 240° C. during the stripping process, by introducing of a solution of iodine in xylene and stirring for 15 minutes. The iodine is 300 ppm by weight of total molten resin in the flask. Bleaching results in a resin neat color of about 1+.

Comparative Example 2

Current Process Conditions with α, β, Limo, Sty

Same procedure as that described in Comparative Example 1, except that 7.9 g of aluminum chloride and a blend of alpha pinene, beta pinene, limonene, and styrene (30:25:15:30 weight ratio) were employed. The resulting resin had the following properties: s.p.=91° C., yield=83%, neat color=3+ Gardner.

Comparative Example 3

Current Process Conditions with α, Sty—i.e. with 0% Limonene

Same procedure as that described in Comparative Example 1, except that 7.0 g of aluminum chloride and a blend of alpha pinene and styrene (60:40 weight ratio) were employed. The resulting resin had the following properties: s.p.=76.1° C., yield=58.1%, neat color=5 Gardner.

Comparative Example 4

Current Process Conditions with α, β, Limo, Sty Different Ratio Vs. CE2

Same procedure as that described in Comparative Example 1, except that a blend of alpha pinene, beta pinene, limonene, and styrene (15:40:15:30 weight ratio) was employed. The resulting resin had the following properties: s.p.=94.3° C., yield=89%, neat color=2+Gardner.

All four comparative examples above show that attempting to synthesize styrenated terpene resins with no/minimal limonene (i.e. limonene at 0-5%) under current process conditions, i.e. using a 45° C. polymerization temperature, leads to products with a softening point of well below 100° C. at low yields.

Example 5

Cloud points of tackifiers were measured to establish compatibility in adhesive systems.

TABLE I

| Resin | Elvax 250 Cloud Point (° C.) |
|---|---|
| ZT105LT | 69.5 |
| ZT106LT | 71.0 |
| Resin of Example 3 | 69.5 |

Table I shows that the resin of this invention was comparable in compatibility to the commercial grades.

Example 6

EVA Adhesive of Resin from Example 3

EVA adhesives were prepared to determine adhesion performance of the resin of invention with that of commercial resin grades.

Formulation

| | |
|---|---|
| Microcrystalline Wax (M7381 from Sasol) | 19.5% |
| Irganox 1010 (Antioxidant from Ciba) | 0.5% |
| EVA 33% VA, 400 MI (Elvax 140 from DuPont) | 40.0% |
| Resin | 40.0% |

The substrate used for this test was high gloss UV cured full coverage file folder stock.

TABLE II

| ZT106LT | 5.9 pounds | (fiber tear) |
|---|---|---|
| ZT105LT | 6.2 pounds | (fiber tear) |
| Resin of Example 3 | 6.1 pounds | (fiber tear) |

Table II shows that the resin of this invention was comparable in adhesion to the commercial grades.

Example 7

Pressure Sensitive Adhesive of Resin from Example 3

SBS-based pressure-sensitive adhesives were prepared to determine adhesion performance of the resin of invention with that of commercial resin grades.

Formulation 1 (SBS)—a Typical SBS-Based PSA Formulation

| | |
|---|---|
| Kraton D1102 (from Kraton; contains 28% styrene and 16% di-block) | 32.0% |
| Nyflex 222B (mineral oil from Nynas) | 10.4% |
| Irganox 1010 (Antioxidant from Ciba) | 0.6% |
| Resin | 57.0% |

TABLE III

| Loop Tack on Stainless | Resin of Example 3 | 11.0 |
|---|---|---|
| Steel (lbs) | ZT106LT | 8.6 |
| | ZT105LT | 8.4 |
| 180° Peel on Stainless Steel | Resin of Example 3 | 6.0 |
| (lb/linear inch) | ZT106LT | 5.7 |
| | ZT105LT | 5.7 |
| SAFT (500 g, 1 sq. inch) | Resin of Example 3 | 170° F. |
| | ZT106LT | 170° F. |
| | ZT105LT | 170° F. |

Table III shows that the resin of this invention showed comparable performance in an SBS-based pressure sensitive adhesive to the commercial grades.

Example 8

Pressure Sensitive Adhesive of Resin from Example 3

SIS-based pressure-sensitive adhesives were prepared to determine adhesion performance of the resin of invention with that of commercial resin grades.

Formulation 2 (SIS)

| | |
|---|---|
| Vector 4211 (from Dexco; contains 30% styrene and <1% di-block) | 14.0% |
| Kraton 1161 (from Kraton; contains 15% styrene and 19% di-block) | 18.0% |
| Nyflex 222B (mineral oil from Nynas) | 13.0% |
| Resin | 55.0% |

TABLE IV

| Loop Tack on Stainless | Resin of Example 3 | 7.8 |
|---|---|---|
| Steel (lbs) | ZT106LT | 7.5 |
| | ZT105LT | 7.0 |
| 180° Peel on Stainless Steel | Resin of Example 3 | 5.6 |
| (lb/linear inch) | ZT106LT | 4.8 |
| | ZT105LT | 5.5 |
| SAFT (500 g, 1 sq. inch) | Resin of Example 3 | 177° F. |
| | ZT106LT | 177° F. |
| | ZT105LT | 178° F. |

Table IV shows that the resin of this invention showed comparable performance in an SIS-based pressure sensitive adhesive to the commercial grades.

Example 9

Oxidative Stability of Resin of Example 3

TABLE V

| Resin | Initial Color | 1 week color at 93° F. | 5 week color at 93° F. | 9 week color at 93° F. | 14 week color at 93° F. |
|---|---|---|---|---|---|
| Zt106LT | 2.0 | 2.3 | 2.4 | 2.9 | 3.6 |
| Resin of Example 3 | 1.3 | 1.3 | 1.5 | 1.8 | 2.3 |

Results in Table V show that the resin of this invention has very good storage stability and it compared well with the commercial grade.

Example 10

Odor of Resin of Example 3

TABLE VI

| Resin | Odor Rating |
|---|---|
| ZT106LT | 4.8 |
| ZT105LT | 3.5 |
| Resin of Example 3 | 2.2 |

Results in Table VI show that the resin of this invention has exceptionally mild odor, and in fact the odor was considerably lower than that of the existing commercial grades.

Example 11

Molten Storage Stability (Color at 185° C.) of Resin of Example 3

TABLE VII

| | Initial | 3 h color @185° C. | 20 h color @185° C. | 23 h color @185° C. | 26 h color @185° C. | 44 h color @185° C. | 48 h color @185° C. |
|---|---|---|---|---|---|---|---|
| ZT106LT | 2.7 | 2.8 | 3.1 | 3.8 | 4 | 4.5 | 4.6 |
| Resin of Example 3 | 1.5 | 1.5 | 1.6 | 1.7 | 1.7 | 1.9 | 1.9 |
| ZT105LT | 2.6 | 2.8 | 3.2 | 3.6 | 3.8 | 4.5 | 4.6 |

Data in Table VII show that compared to commercial grades, the resin of this invention has excellent, and in fact improved, color stability under molten storage at 185° C. over a 48-hour period.

As used throughout, ranges are used as a short hand for describing each and every value that is within the range, including all sub-ranges therein.

Numerous modifications and variations on the present invention are possible in light of the above teachings. It is, therefore, to be understood that within the scope of the accompanying claims, the invention may be practiced otherwise than as specifically described herein.

As used throughout, ranges are used as a short hand for describing each and every value that is within the range, including all sub-ranges therein.

All of the references, as well as their cited references, cited herein are hereby incorporated by reference with respect to relative portions related to the subject matter of the present invention and all of its embodiments

What is claimed is:

1. A styrenated terpene resin having a softening point of at least 95° C. made by reacting a mixture comprising:
    less than 15 wt % of limonene;
    from 25 to 35 wt % of alpha pinene;
    from 25 to 45 wt % of beta pinene; and,
    from greater than 25 wt % of styrene or derivative thereof.

2. The resin of claim 1, wherein the weight ratio of styrene or derivative thereof to total terpene is from 30:70 to 35:65.

3. The resin of claim 1, wherein the reaction product comprises:
    from 1 to 14 wt % limonene;
    from 35 to 40 wt % of beta pinene;
    from greater than 25 to 35 wt % of styrene or derivative thereof; and,
    from 25 to 35 wt % of alpha pinene.

4. The resin of claim 3, wherein the weight ratio of styrene or derivative thereof to total terpene is from 30:70 to 35:65.

5. A hot melt adhesive comprising a styrenated terpene resin, said resin having a softening point of at least 95° C., and said resin made by reacting a mixture comprising:
    less than 15 wt % of limonene;
    from 25 to 35 wt % of alpha pinene;
    from 25 to 45 wt % of beta pinene; and,
    from greater than 25 wt % of styrene or derivative thereof.

6. The hot melt adhesive of claim 5, wherein the weight ratio of styrene or derivative thereof to total terpene is from 30:70 to 35:65.

7. The hot melt adhesive of claim 5, wherein the reaction product comprises:
    from 1 to 14 wt % limonene;
    from 35 to 40 wt % of beta pinene;
    from greater than 25 to 35 wt % of styrene or derivative thereof; and,
    from 25 to 35 wt % of alpha pinene.

8. The hot melt adhesive of claim 7, wherein the weight ratio of styrene or derivative thereof to total terpene is from 30:70 to 35:65.

9. The resin of claim 1 wherein said reaction product is produced at a reaction temperature in the range of from −20° C. to about +10° C.

10. The hot melt adhesive of claim 5 wherein said reaction product is produced at a reaction temperature in the range of from −20° C. to about +10° C.

11. A styrenated terpene resin having a softening point of at least 95° C., made by reacting a mixture comprising:
   less than 15 wt % of limonene;
   from 25 to 35 wt % of alpha pinene;
   from 25 to 45 wt % of beta pinene; and,
   from greater than 25 wt % of styrene or derivative thereof,
   wherein said reaction product is produced at a reaction temperature in the range of from −20° C. to about +10° C.

12. The resin of claim 11, wherein the weight ratio of styrene or derivative thereof to total terpene is from 30:70 to 35:65.

13. The resin of claim 11, wherein the reaction product comprises:
   from 1 to 14 wt % limonene;
   from 35 to 40 wt % of beta pinene;
   from greater than 25 to 35 wt % of styrene or derivative thereof; and,
   from 25 to 35 wt % of alpha pinene.

14. The resin of claim 13, wherein the weight ratio of styrene or derivative thereof to total terpene is from 30:70 to 35:65.

15. A hot melt adhesive comprising a styrenated terpene resin, said resin having a softening point of at least 95° C., and said resin made by reacting a mixture comprising:
   less than 15 wt % of limonene;
   from 25 to 35 wt % of alpha pinene;
   from 25 to 45 wt % of beta pinene; and,
   from greater than 25 wt % of styrene or derivative thereof,
   wherein said reaction product is produced at a reaction temperature in the range of from −20° C. to about +10° C.

16. The hot melt adhesive of claim 15, wherein the weight ratio of styrene or derivative thereof to total terpene is from 30:70 to 35:65.

17. The hot melt adhesive of claim 15, wherein the reaction product comprises:
   from 1 to 14 wt % limonene;
   from 35 to 40 wt % of beta pinene;
   from greater than 25 to 35 wt % of styrene or derivative thereof; and,
   from 25 to 35 wt % of alpha pinene.

18. The hot melt adhesive of claim 17, wherein the weight ratio of styrene or derivative thereof to total terpene is from 30:70 to 35:65.

\* \* \* \* \*